United States Patent

[11] 3,626,225

| [72] | Inventor | Edward M. Pauwels |
| | | South Bend, Ind. |
| [21] | Appl. No. | 42,112 |
| [22] | Filed | June 1, 1970 |
| [45] | Patented | Dec. 7, 1971 |
| [73] | Assignee | The Bendix Corporation |

[54] WHEEL SPEED SENSOR FOR AN ADAPTIVE BRAKING SYSTEM HAVING A ROTATABLE TONE WHEEL AND ELECTROMAGNETIC PICKUP MEANS
10 Claims, 11 Drawing Figs.

[52] U.S. Cl. ..................................... 310/168,
105/215 C, 310/80, 310/90
[51] Int. Cl. ..................................... H02k 19/20
[50] Field of Search .......................... 310/79–82,
90, 168–171, 112, 114, 120, 121; 73/529;
74/11–13; 324/174; 179/100.27; 295/36, 43;
105/61, 217, 118, 215 C; 108/55; 317/5; 303/20,
21

[56] References Cited
UNITED STATES PATENTS

| 1,797,579 | 3/1931 | Hoffman | 74/12 |
| 3,482,130 | 12/1969 | Woodward | 310/168 |
| 3,469,135 | 9/1969 | Haviland | 310/168 |
| 3,447,838 | 6/1969 | Haviland | 188/181 |
| 3,509,395 | 4/1970 | Schrecongost | 310/168 |
| 2,798,976 | 7/1957 | Eckel | 310/168 |
| 3,198,973 | 8/1965 | Short | 310/168 |
| 3,280,934 | 10/1966 | De Bias | 105/215 |

*Primary Examiner*—D. F. Duggan
*Assistant Examiner*—R. Skudy
*Attorneys*—William N. Antonis and Plante, Hartz, Smith & Thompson ABSTRACT: A compact driven wheel, tone wheel and pickup assembly mounted on a unitary housing. The assembly has a leaf spring section which urges the driven wheel into contact with an elastomeric portion of a drive wheel mounted on the vehicle axle or wheel hub. The pickup generates an electric signal which is representative of the rotational speed of the vehicle wheel. The drive wheel can be mounted without removing the axle shaft from the axle housing.

PATENTED DEC 7 1971

INVENTOR.
EDWARD M. PAUWELS
BY
Plante, Hartz, Smith &
Thompson
ATTORNEYS

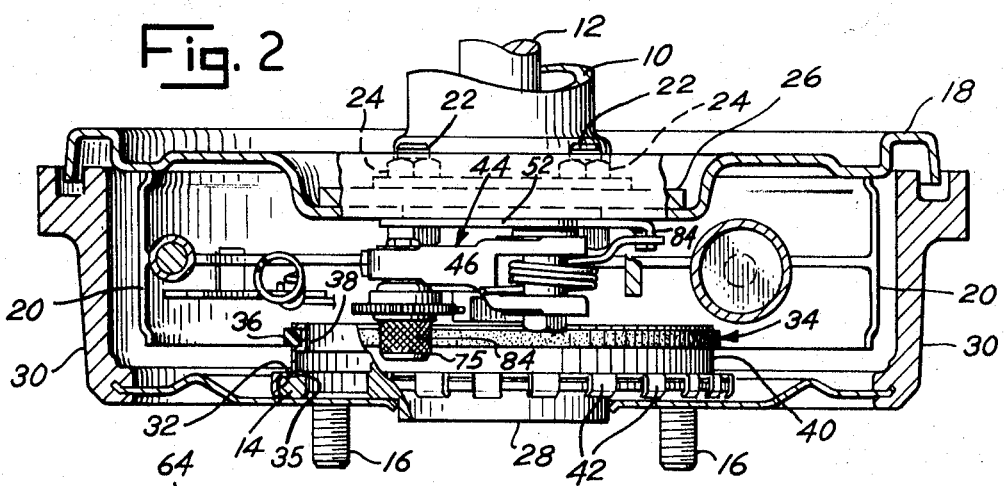
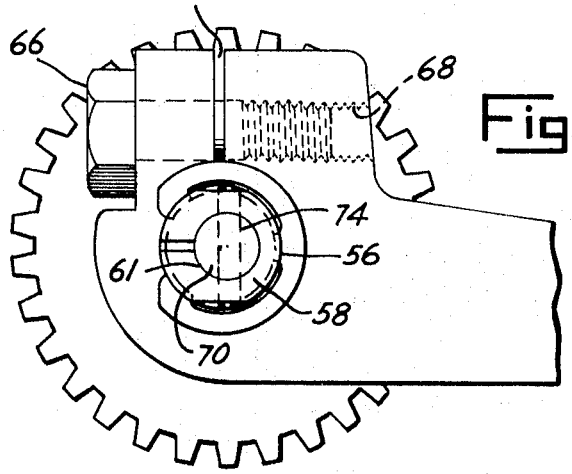
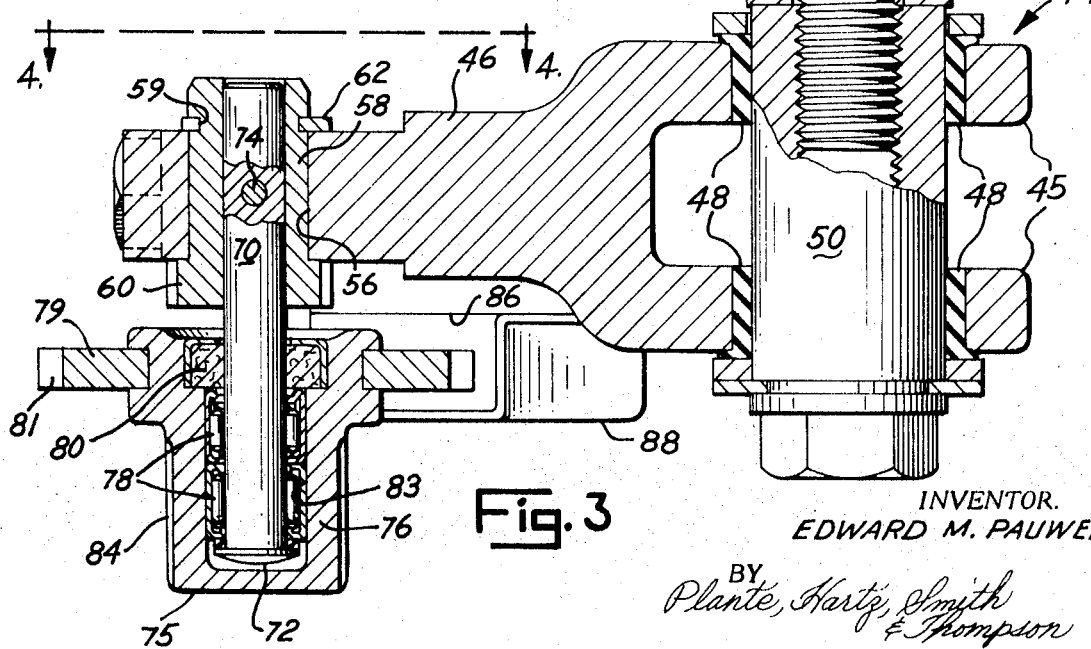

INVENTOR.
EDWARD M. PAUWELS

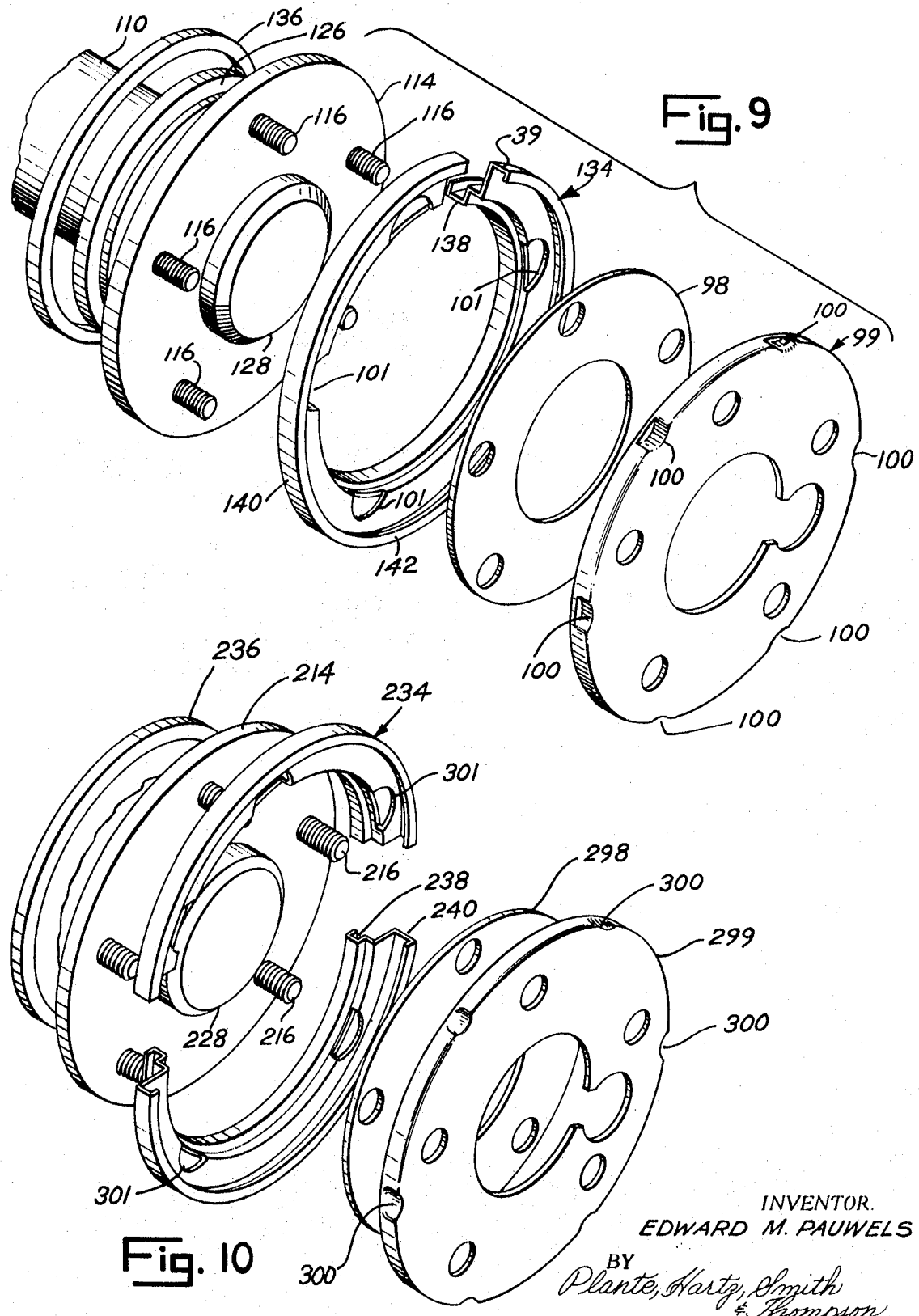

WHEEL SPEED SENSOR FOR AN ADAPTIVE BRAKING SYSTEM HAVING A ROTATABLE TONE WHEEL AND ELECTROMAGNETIC PICKUP MEANS

SUMMARY OF THE INVENTION

This invention relates to an adaptive braking system for use on an automobile. More specifically, it relates to the wheel speed sensor which provides the adaptive braking system with information relative to the speed and acceleration of one of the several wheels of an automotive vehicle. An adaptive braking system of the type in which the invention could be used is described in U.S. Pat. No. 3,494,671.

One approach to the solution of the wheel speed sensor problem has been to mount a large diameter tone wheel directly on the axle or hub of the vehicle wheel and place in proximity to it an electromagnetic pickup element mounted on a fixed element of the vehicle suspension. While a modicum of success has been obtained with this arrangement, a number of problems has arisen, of which the principle one is the difficulty of maintaining a fixed and constant clearance between the tone wheel and the pole piece of the pickup. Variations of this clearance produce signal variations which may be misinterpreted by the adaptive braking system computer resulting in faulty operation. It is an object of this invention to overcome this difficulty by providing a pickup and tone wheel assembly having a fixed clearance.

A further object is to provide a wheel speed sensor which is compact and adaptable to mounting within the confined spaces inside an automobile brake drum.

A still further object is to provide a wheel speed sensor including a unitary housing, mounting bracket and leaf spring element which combines low cost and simple installation with elimination of problems of friction and binding due to corrosion and dirt.

Yet another object of the invention relates to provision of a friction drive wheel adapted to be assembled upon a flanged rear axle without removal of the axle from the axle housing.

BRIEF DESCRIPTION OF THE DRAWINGS

FIG. 2 is a partial cross-sectional view along line II—II of FIG. 1 with the brake drum and axle flange shown.

FIG. 3 is an enlarged cross-sectional view of the driven wheel, tone wheel and pickup assembly of FIGS. 1 and 2 taken along line III—III of FIG. 1.

FIG. 4 is a partial elevational view of FIG. 3 taken along line IV—IV thereof.

FIG. 9 is an isometric exploded view of the friction drive wheel components and part of a flanged rear axle to illustrate one construction.

FIG. 10 is an isometric exploded view of the friction drive wheel components and part of a flanged rear axle to illustrate another construction.

DETAILED DESCRIPTION OF THE INVENTION

Figure 1:
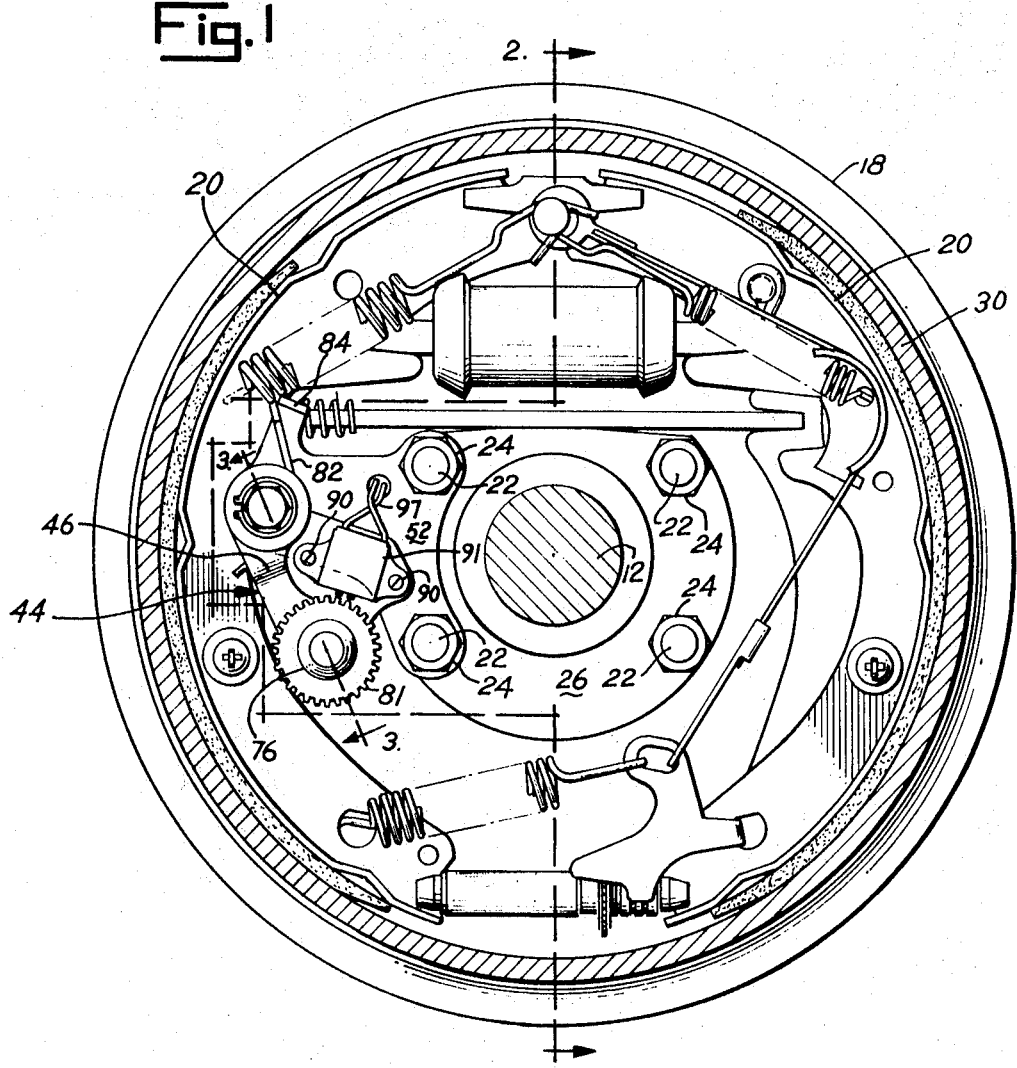
FIG. 1 is a view of an automobile rear brake and axle with the wheel removed and brake drum and axle flange cut away to show one form of the invention.

FIGS. 1 and 2 show a conventional rear axle housing 10 containing an axle 12 formed with a flange 14 into which are pressed the usual wheel mounting bolts 16. A brake backing plate 18 to which are attached the usual parts of a brake, such as the shoes 20, is mounted by bolts 22 and nuts 24 to a flange 26 of the axle housing 10. The outer face of the axle flange 14 is formed with a pilot projection 28 which is usually made accurately concentric with the bearing surfaces (not shown) of the axle. The central bore of a brake drum 30 pilots on the projection 28 and the drum 30 is held in place by being clamped between the wheel (not shown) and the axle flange 14.

In order to carry out the invention, the flange 14 of the axle 12 is also formed with a pilot diameter 32. A friction drive wheel 34 is made up of an elastomeric friction ring 36 and a circular metal part formed with a groove or channel 38 to receive the friction ring 36, a cylindrical portion 40 centered on flange base 35, and a multiplicity of hooked spring fingers 42 adapted to engage the outer periphery of the axle flange 14 to retain the drive wheel 34 positively in place, thus providing what may be termed a snap-on assembly.

The pickup, tone wheel assembly is indicated generally by the numeral 44 (see FIG. 3). It comprises an arm 46 with one end formed as a yoke 45 pivoted by means of bushings 48 on a stud 50 secured to a bracket 52 by a cap screw 54. The bracket 52 is attached to the axle housing by means of one or more of the bolts 22 and nuts 24 which also serve to secure the backing plate 18. The other end of the arm 46 is formed with a bore 56 in which is received an eccentric bushing 58. The eccentric bushing 58 is secured endwise by an integral slotted head 59 at one end and a snap ring 62 seated in the slot and, at the other end, a flange 60. As seen in FIG. 4, a slot 64 intersects the bore 56 and, in combination with a clamp screw 66 threaded into another bore at right angles to the slot 64, forms a means for securing the eccentric bushing 58 against rotation. A shaft 70 having a head or flange 72 at one end is secured in the eccentric bore 61 of the bushing 58 by a pin 74 fitted into a suitable cross hole.

The driven wheel 75 of the sensor is a cup-shaped element 76 which contains a pair of roller bearings 78 and a seal 80 within the cup recess 83. The driven wheel 75 is mounted on the shaft 70 by means of the bearings 78 and the flange 72 of the shaft 70 which thus forms a thrust bearing and axial retainer by being confined between the bottom of the recess 83 and one end of the pressed-in bearings 78. The outside diameter of the driven roller element 76 is knurled as at 84 for frictional driving engagement with the elastomeric element 36 of the drive wheel 34. Near one end of the driven wheel 75 is formed a flange 79, which can be a separate piece attached as by riveting or formed as an integral part of the driven wheel 75, depending upon the requirements of fabrication. The outer periphery of flange 79 is formed with a plurality of teeth 81 (similar to gear teeth) which are designed to constitute signal generating elements in combination with the electromagnetic pickup element to be described later. A spiral spring 82 (shown in FIG. 1) is disposed around the stud 50 between the parts of the yoke portion 45 of the arm 46. One end of this spring 82 bears against a projection 84 of the bracket 52 and the other bears against the arm 46 to cause the arm 46 to pivot about the stud 50 and bring the driven wheel 75 into engagement with the drive wheel 34.

Figure 1A:
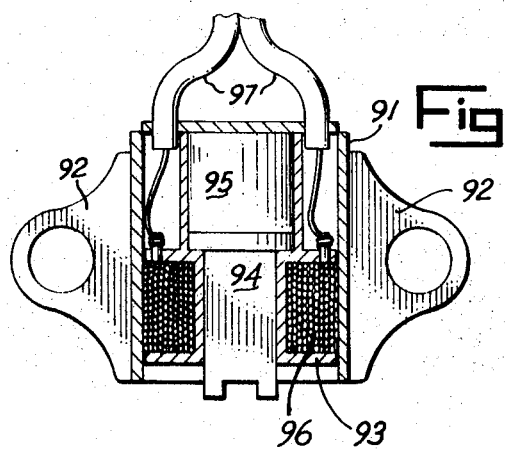
FIG. 1a is a cross-sectional view of the pickup in FIG. 1 to show the internal construction.
Figure 6:
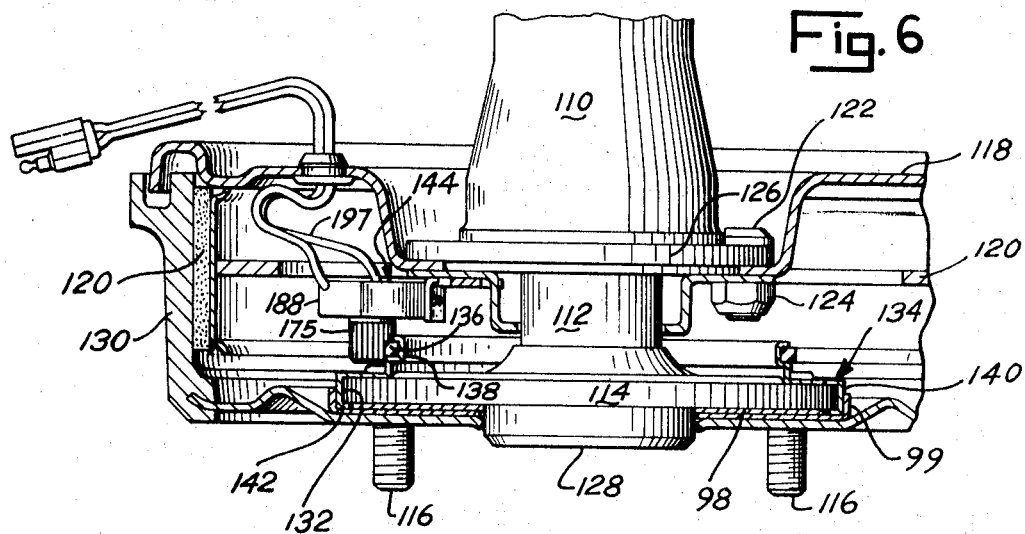
FIG. 6 is a partial sectional view taken along line VI—VI of FIG. 5.
Figure 5:
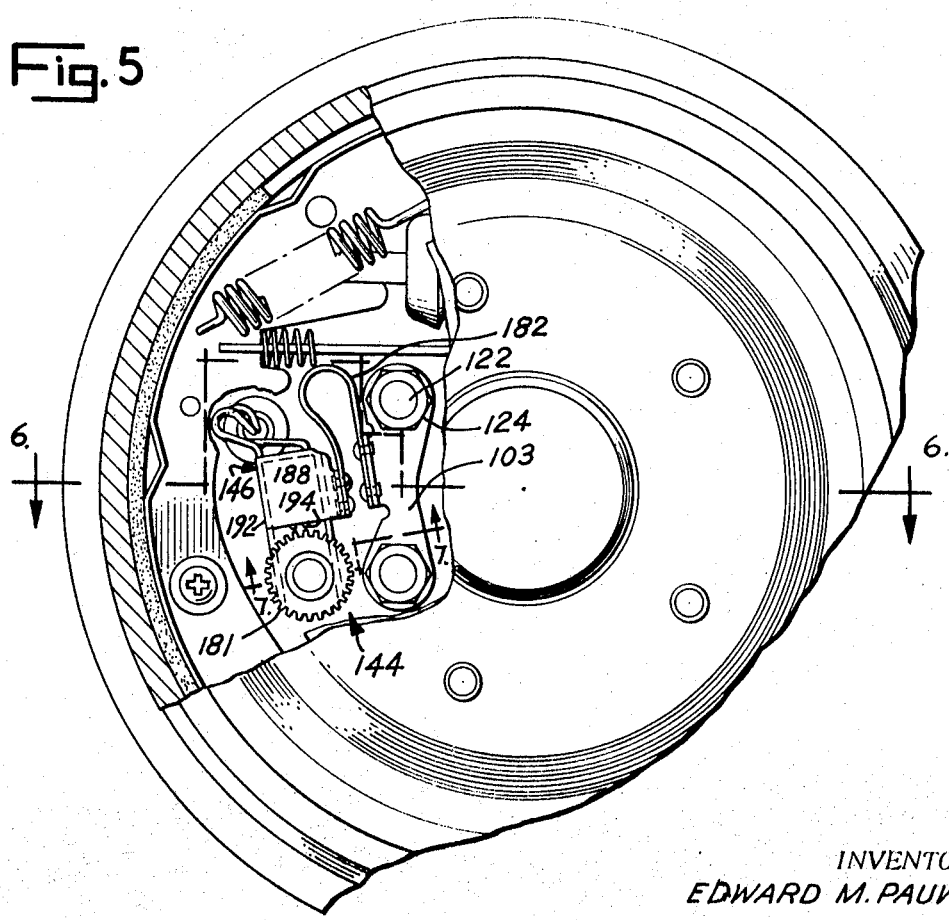
FIG. 5 is a view of an automotive rear brake with the wheel removed and a partial sectioning of the brake drum and drive wheel to show a second form of the invention.
Figure 7:
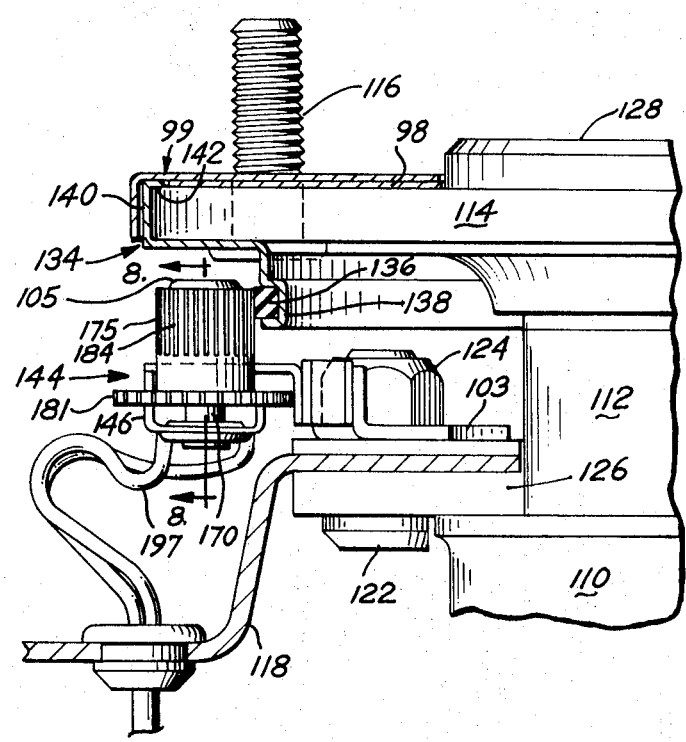
FIG. 7 is a partial sectional view taken along line VII—VII of FIG. 5.
Figure 8:
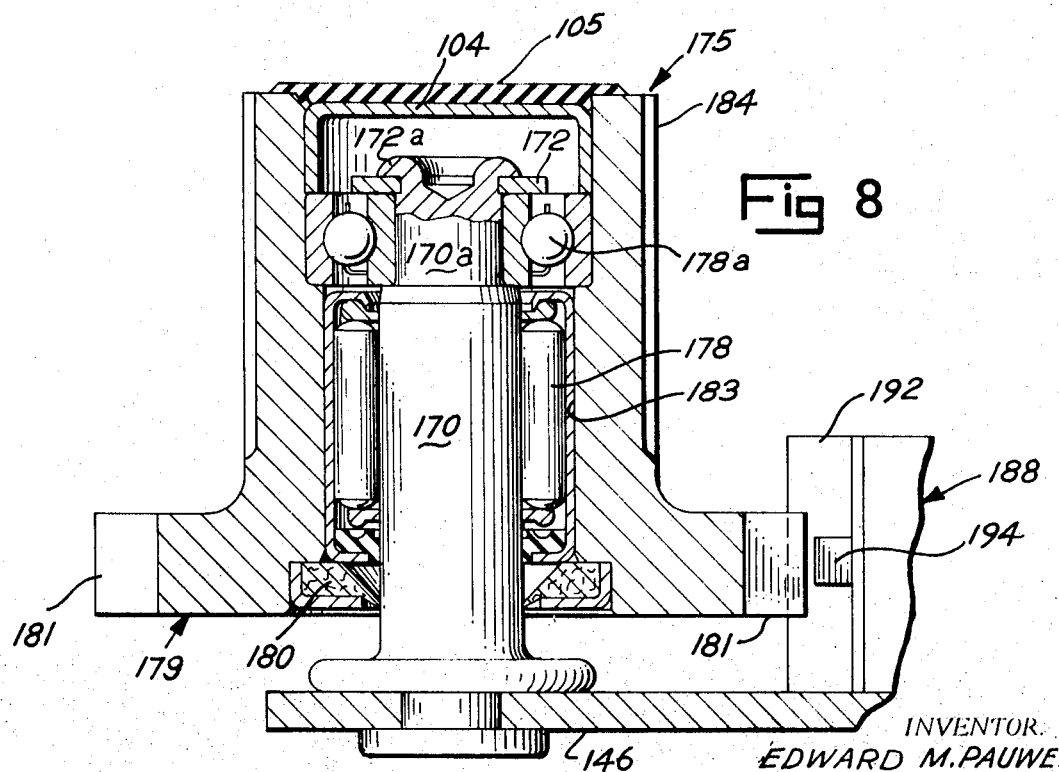
FIG. 8 is an enlarged sectional view along VIII—VIII of FIG. 7 illustrating the interior construction of the driven wheel, tone wheel and pickup assembly of FIGS. 5, 6 and 7.

The arm 46 is formed with a plane surface 86 against which an electromagnetic pickup element 88 is mounted by means of a pair of screws or rivets 90 (shown in FIG. 1). It comprises (as seen in FIG. 1a) a ferromagnetic box or shell 91 having suitable mounting ears 92 and containing a molded plastic spool or coil former 93 within which are positioned a ferromagnetic pole piece 94 and a high energy permanent magnet 95, and on an outer surface of which is wound a coil 96 of many turns of fine wire. Two lead wires 97 are connected to the ends of this coil. After all the parts are placed in their proper position, a potting compound is poured around them to complete the assembly.

Another form of the invention is illustrated in FIGS. 5, 6, 7, 8 and 9 in which parts similar to parts in the preceding figures are designated by the same numerals increased by 100. Consequently, only those features which differ materially from those of the preceding figures will be described in detail. Referring now to these figures, with special reference to FIG. 9, it will be seen that the friction drive wheel 134 is now formed with a cylindrical portion 140 which pilots closely on the outside diameter 132 of the axle shaft flange 114 which is specially turned to make it accurately concentric with the bearing surfaces of the axle 112. Instead of being a solid ring, the circular metal part, which includes the groove 138 and the cylindrical part 140, is split at 39 in a radial plane so that it can be elastically distorted into a helicoidal shape and make a snap-on assembly without removing the axle 112 from the axle housing 110. An inturned flange 142 extending about a sixteenth of an inch radially inwardly along the outer face of the axle flange 114 serves the same purpose as the spring fingers 42 of the embodiment of FIGS. 1, 2, 3 and 4. A plane washer-shaped piece 98 of sheet metal of equal thickness to the flange 142 is provided to fill the space between the inner margin of the flange 142 and the axle pilot 128. Finally, to retain these parts and positively urge the friction drive wheel 134 back to its circular shape with no gap at the radial split 39, a cup-shaped element 99 is made up of a radial flange designed to be clamped between the axle shaft flange 114 and the washer 98. The cup-shaped element 99 has a cylindrical portion slightly larger in diameter than that of the friction wheel 134 and has several inwardly projecting bumps 100 which engage the cylindrical part 140 for the purpose aforesaid. The circular metal part 140 is provided with cutout portions 101 to provide clearance for the projecting heads of the wheel bolts 116. It is obvious that, once the metal parts are assembled onto the axle flange 114, the elastomeric ring 136 can be stretched over the flange 114 quite readily and then be seated into the groove or channel 138.

The further modification of FIGS. 10, in which like parts are designated by the same numerals plus 200, is another way to provide for a snap-on assembly of the friction drive wheel 234. In this form of the invention, the friction drive wheel 234 is split on a diametral plane into two identical halves which are readily assembled to the axle flange 214 and held in place by the cup-shaped element 299.

Returning now to FIGS. 5, 6, 7, 8 and 9, the pickup, tone wheel and driven wheel assembly 144 has its structural elements made up of a metal stamping 146, a portion of which is formed into the shape of a box 192 to receive the pole piece 194 and a magnet of the pickup 188. Another portion of the stamping 146 has a shaft 170 riveted to it, and a third portion has riveted to it a C-shaped spring 182. The other arm of this spring 182 is riveted to a bracket 103 which is mounted on the flange 126 of the axle housing 110 by means of the bolts 122 and nuts 124. The driven wheel 175 is rotatably mounted on the shaft 170 by a roller bearing 178 and a ball bearing 178a which is seated against a shoulder formed by a reduced diameter portion 170a of the shaft 170. The ball bearing 178a is retained thereon by a washer 172 and a rivet formed shoulder 172a so that the ball bearing can act as the endwise positioning and thrust taking element. For ease of assembly, the driven wheel 175 is initially formed with a through bore 183 which is subsequently closed by insertion into the open end thereof of a cup-shaped stamping 104 which is then permanently sealed by the application of a sealing compound 105. In this modification, the fixed permanent clearance between the teeth 181 of the tone wheel 179 and the pole piece 194 is predetermined by positioning the parts prior to insertion of the potting compound which, upon hardening, holds everything in its predetermined relationship.

OPERATION

The friction drive wheels 34, 134 or 234 rotate with the vehicle wheel. The springs 82 or 182 hold the driven wheels 75 or 175 in close contact with the elastomeric rings 36, 136 or 236 whereby the tone wheels 79 or 179 are rotated at very high speed. As they rotate, the teeth 81 or 181 are alternately aligned and not aligned with the pole pieces 94 or 194. The reluctance of the flux path for the field established by the permanent magnets 95 is thereby altered and the flux passing through the pole pieces 94 or 194 changes. The changes in flux induce a voltage in the coils 96 which alternates with each alignment and nonalignment. The frequency of this alternating voltage is proportional to the wheel speed. By the application of well-known techniques, the frequency may be measured to provide a direct indication of the wheel speed.

It should be noted that in the form of the invention shown in FIGS. 5, 6, 7, 8 and 9, the spring 182 acts not only as a spring but as a connection and support between the structural elements 146 of the tone wheel, driven wheel, pickup assembly 144 and the bracket 152.

We claim:
1. A wheel speed sensor comprising:
   a friction drive wheel mounted concentrically with a vehicle axle;
   a driven wheel movably mounted to a stationary portion for frictional engagement with the friction drive wheel;
   a tone wheel connected to the driven wheel;
   an electromagnetic pickup element;
   characterized by the driven wheel and tone wheel being a unitary cup-shaped and flanged element with an inner and outer surface and a periphery in which:
   the inner recess of the cup contains antifriction bearings;
   the outer surface of the cup is knurled for frictional engagement with the friction drive wheel; and
   the periphery of the flanged element is formed with teeth to constitute signal generating elements for operating said electromagnetic pickup to generate a signal representative of wheel rotational velocity.
2. The wheel speed sensor of claim 1 in which the drive wheel is constructed and arranged for snap-on assembly on an axle flange of said vehicle axle.
3. The wheel speed sensor of claim 1 in which the drive wheel is formed with a multiplicity of spring fingers for snap-on assembly to an axle flange of said vehicle axle.
4. The wheel speed sensor of claim 1 wherein:
   an axle flange of said vehicle axle is formed with a pilot diameter:
   said friction drive wheel is provided with a cylindrical portion to mate with said pilot diameter for concentric location thereof on said vehicle axle; and
   said friction drive wheel is constructed and arranged for snap-on assembly to said axle flange.
5. The wheel speed sensor of claim 1 wherein:
   an axle flange of said vehicle axle is formed with a pilot diameter;
   said friction drive wheel is provided with a cylindrical portion to mate with said pilot diameter for concentric location thereof on the axle; and
   said friction drive wheel is formed with a multiplicity of spring fingers for snap-on assembly to the axle flange.
6. The wheel speed sensor of claim 1 wherein the driven wheel, tone wheel and electromagnetic pickup are combined into a unitary assembly with a spring means for maintaining frictional engagement between said driven wheel and said friction drive wheel, said assembly being mounted on said stationary portion.
7. The wheel speed sensor of claim 6 in which said assembly includes:
   a shaft which receives the antifriction bearing of the cup-shaped element; and
   adjustable means constructed and arranged to enable permanent adjustment of the clearance between the signal generating elements of the tone wheel and the electromagnetic pickup.
8. A wheel speed sensor comprising:
   a friction drive wheel means mounted concentrically with a vehicle axle;
   driven wheel means movably mounted on a nonrotatable portion for frictional engagement with said friction drive wheel;

a tone wheel connected to the driven wheel means:
an electromagnetic pickup element located in close proximity with said tone wheel for generating a signal representative of the rotational velocity of said tone wheel;
means for combining the driven wheel means, tone wheel and pickup into an assembly;
characterized by the drive wheel being constructed and arranged for snap-on assembly to an axle flange of said vehicle axle.

9. A wheel speed sensor comprising:
a friction drive wheel mounted concentrically with a vehicle axle;
a driven wheel mounted for frictional engagement with the drive wheel;
a tone wheel connected to the driven wheel;
an electromagnetic pickup element in close proximity with said tone wheel for generating a signal representative of the rotational velocity of said vehicle wheel;
structural elements combining the driven wheel, tone wheel and pickup into an assembly;
a bracket attached to an axle housing of said vehicle axle; and
spring means interposed between said bracket and said structural means for urging the driven wheel into said frictional engagement;
characterized by the structural elements, bracket and spring means being a unitary assembly in which the spring means is constituted by a generally C-shaped leaf spring portion which acts as connection and support between said structural elements and said bracket.

10. A wheel speed sensor comprising:
a friction drive wheel mounted concentrically with a vehicle axle;
a driven wheel mounted for frictional engagement with the drive wheel;
a tone wheel connected to the driven wheel;
an electromagnetic pickup means for determining the rotational velocity of said tone wheel;
means for combining the driven wheel, tone wheel and pickup into an assembly;
a bracket attached to a housing of said vehicle axle; and
spring means interposed between the bracket and said structural means for urging the driven wheel into said frictional engagement;
characterized by said structural elements including:
a shaft on which the driven wheel and tone wheel are rotatably mounted;
an eccentric bushing in which said shaft is mounted for adjusting clearance between the tone wheel and
the pickup means;
means for rotating said eccentric bushing; and
means for clamping said bushing against further rotation.

* * * * *